(No Model.)
J. E. MORRISON.
MILK CAN.
No. 446,949. Patented Feb. 24, 1891.
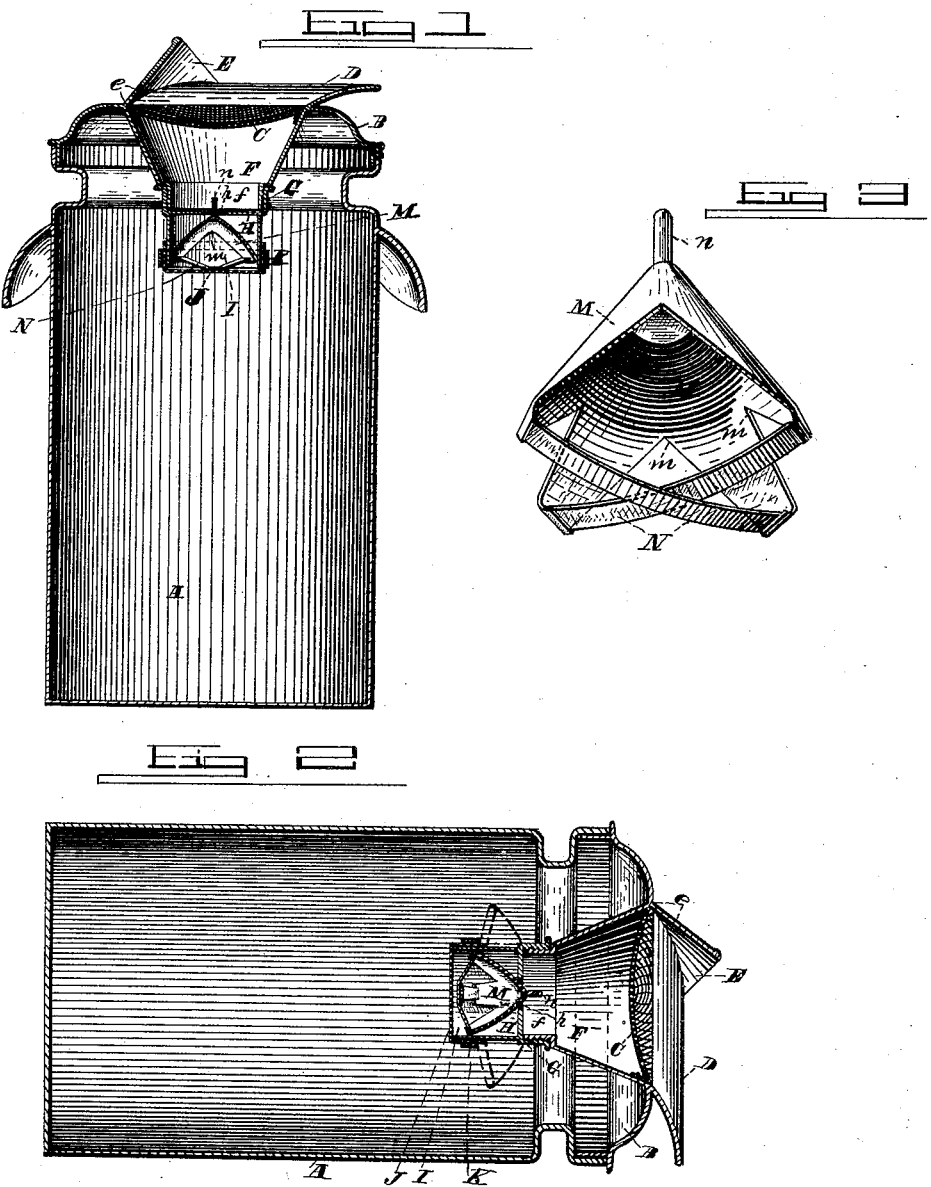
Witnesses
C. W. Seville
A. E. Dowell
Inventor
J. E. Morrison
By his Attorney
T. N. Alexander

UNITED STATES PATENT OFFICE.

JAMES E. MORRISON, OF URBANA, ILLINOIS.

MILK-CAN.

SPECIFICATION forming part of Letters Patent No. 446,949, dated February 24, 1891.

Application filed May 5, 1890. Serial No. 350,624. (No model.)

*To all whom it may concern:*

Be it known that I, JAMES E. MORRISON, of the city of Urbana, in the county of Champaign and State of Illinois, have invented certain new and useful Improvements in Milk-Cans; and I do hereby declare that the following is a full, clear, and exact description thereof, reference being had to the accompanying drawings, and to the letters of reference marked thereon, which form part of this specification, in which—

Figure 1 is a vertical transverse section through a milk-can, showing my improved straining and closing devices. Fig. 2 is a similar view of the can upset and the valve closed. Fig. 3 is a detail view of the valve.

This invention is an improvement in milk-cans or milking-pails; and its object is to provide a straining and closing device for the can and so construct the same that it can be used as a milking-pail.

The invention consists in the novel construction and combination of strainers and valves with the can-top, as will be hereinafter clearly described and claimed.

Referring by letter to the drawings, A designates an ordinary milk-can; B, the cover, which has a large central opening, over which is secured a concavo-convex strainer C of fine wire mesh or other suitable material.

D designates an outwardly and upwardly flaring brim extending nearly around the periphery of strainer C, but of crescent form, its widest portion projecting to about the periphery of the cover at one side.

E designates a crescent-shaped guard-piece opposite the widest portion of brim D and projecting partly over and above the strainer C, its lower edge being united to the adjoining edges of the brim and to the cover, as indicated at *e*.

When the can is used in milking, the streams of milk are directed onto the strainer C and toward and under guard E, which, if the milk splashes or sprays, will catch the flying particles and return them onto the strainer, while brim D increases the surface onto which the milk can be directed and will drain the milk onto strainer C also.

Directly below strainer C and secured to the cover is an inverted conical deflector F, onto which the milk falls after passing through strainer C. The opening in the lower smaller end of this deflector has a screw-threaded flange *f*, which is engaged by the oppositely-threaded rim G of a cap H, which closes the lower end of deflector F, but is thus removably secured thereto. The cap has a small central opening *h* in it, through which fluid can pass into the body of the can.

I designates a short cylinder depending from and secured by one end to cap H and about equal in diameter thereto, and J represents a strainer-cloth drawn over the open lower end of said cylinder and secured thereto by a collar K, which slips over the cylinder and compresses the ends of the cloth against the sides thereof, as in ordinary strainers. The milk is thus first passed through the metallic strainer C onto the cap H, and thence through opening *h* onto and through the cloth-strainer before it escapes into the body of the can, and the cap H will catch and retain sediment and dust which might pass through strainer C, thus insuring the purity and cleanliness of the milk in the can. The milk enters the body of the can through the small opening *h*, and in transportation, no matter how violently the milk be agitated by shaking the can, it will be thrown back into the can by the deflector F, and the cylinder I will largely or entirely prevent splashing of milk through opening *h*. However, in order to close said opening in case the can be upset, I employ a valve M, loosely confined in the cylinder, which is open so long as the can is upright, but will close opening *h* if the can be overturned or should the milk surge up into the cylinder I. This valve consists of a hollow conical body, preferably made of thin metal, and having a base diameter nearly equal to the interior diameter of cylinder I, within which it is placed point upward. The bottom edges of the valve are notched, however, as at *m m*, and across its bottom may be secured light downwardly-bowed strips of metal N, which sustain the valve upon the cloth *i* and prevent its cutting the latter. From the apex of the valve rises a pin *n*, which at all times when the parts are in position plays in opening *h*, so as to direct the valve to its seat thereagainst when closing.

The cloth might be omitted in some cases, and then valve M could be retained in cylinder I by securing wires across the bottom of the latter, or a fine metallic strainer might be substituted for the cloth.

Owing to the peculiar shape of the valve any fluid which enters the bottom of cylinder I catches under the valve and forces it to its seat.

By unscrewing cap H the valve and other parts of the device can be removed and cleansed.

In transporting milk in the cans after the milking is over, the cap H, with the cylinder and valves, might, if desired, be removed, and another cap similar to cap H, but imperforate, could be screwed onto the lower end of the deflector.

Having described my invention, what I claim as new, and desire to secure by Letters Patent thereon, is—

1. The combination of the cover having an opening in it, a strainer secured thereto over said opening, and an inverted conical deflector secured to the cover below and around said opening, with a cap on the lower end of the deflector, having an opening in it, a cylinder attached to and depending from said cap, and a hollow conical valve having notches in its base loosely confined in said cylinder and adapted to close the opening in the cap, substantially as specified.

2. The combination of the cover having an opening in it closed by a metallic strainer and an inverted conical deflector secured to the cover below the strainer, with the cap removably secured to the lower end of the deflector and having a central opening, a cylinder secured to and depending from said cap, the cloth and its confining-collar, and the hollow conical valve confined in the cylinder and having notches in its base, for the purpose and substantially as specified.

In testimony that I claim the foregoing as my own I affix my signature in presence of two witnesses.

JAMES E. MORRISON.

Witnesses:
JOHN C. ROBERTS,
SOLON PHILBRICK.